United States Patent
Li et al.

(10) Patent No.: US 9,345,046 B2
(45) Date of Patent: May 17, 2016

(54) USER EQUIPMENT AND METHOD FOR DISTRIBUTED CHANNEL ACCESS FOR D2D COMMUNICATIONS

(71) Applicant: Intel IP Corporation, Santa Clara, CA (US)

(72) Inventors: Honggang Li, Beijing (CN); Qinghua Li, San Ramon, CA (US); Alexey Khoryaev, Dzerzhinsk (RU); Yuan Zhu, Beijing (CN); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/124,217

(22) PCT Filed: Nov. 6, 2013

(86) PCT No.: PCT/US2013/068766
§ 371 (c)(1),
(2) Date: Dec. 5, 2013

(87) PCT Pub. No.: WO2014/158235
PCT Pub. Date: Oct. 2, 2014

(65) Prior Publication Data
US 2014/0295858 A1    Oct. 2, 2014

Related U.S. Application Data (60) Provisional application No. 61/806,821, filed on Mar. 29, 2013.

(51) Int. Cl.
*H04W 74/08* (2009.01)
*H04W 72/10* (2009.01)
*H04W 76/02* (2009.01)

(52) U.S. Cl.
CPC .............. *H04W 74/08* (2013.01); *H04W 72/10* (2013.01); *H04W 76/021* (2013.01); *H04W 76/023* (2013.01)

(58) Field of Classification Search
None
See application file for complete search history.

(56) References Cited

U.S. PATENT DOCUMENTS

2009/0005057 A1*  1/2009  Lee et al. ...................... 455/450
2009/0040955 A1   2/2009  Jung et al.

(Continued)

FOREIGN PATENT DOCUMENTS

JP       20104587 A    2/2010
TW    201445991 A    12/2014

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, figure 5.3.3.1-1., [Online]. Retrieved from the Internet: <http://www.3gpp.org/DynaReport/36331.htm>, (Mar. 18, 2013), 108, 129.

(Continued)

*Primary Examiner* — Olumide T Ajibade Akonai
*Assistant Examiner* — Margaret G Mastrodonato
(74) *Attorney, Agent, or Firm* — Schwegman Lundberg & Woessner, P.A.

(57) ABSTRACT

Embodiments of a system and method for distributed channel access for device-to-device (D2D) communication in a wireless network are generally described herein. User equipment (UE) may transmit a connection identifier (CID) code at a beginning of a contention window to request channel access for a D2D transmission to a receiving device. Links for D2D transmissions from a transmitting device to a receiving device are identified by a CID that is mapped to a CID code. The UE may receive a bandwidth grant from the receiving device during the contention window, along with bandwidth grants for other CIDs, in an order based on a priority level of the CID. The UE may transmit data after reception of the bandwidth grants in time-frequency resources indicated in an associated one of the bandwidth grants. In some embodiments, spatial-reuse and variable resource size allocation are supported.

21 Claims, 3 Drawing Sheets

(56) References Cited

U.S. PATENT DOCUMENTS

| | | |
|---|---|---|
| 2009/0290555 A1 | 11/2009 | Alpert et al. |
| 2010/0130237 A1 | 5/2010 | Kitazoe et al. |
| 2010/0208698 A1 | 8/2010 | Lu et al. |
| 2010/0267407 A1* | 10/2010 | Liao et al. ............ 455/509 |
| 2011/0188376 A1 | 8/2011 | Stupar et al. |
| 2012/0106475 A1 | 5/2012 | Jung |
| 2012/0275365 A1 | 11/2012 | Anderson et al. |
| 2013/0012182 A1 | 1/2013 | Liao |
| 2014/0185550 A1 | 7/2014 | Han et al. |

FOREIGN PATENT DOCUMENTS

| | | |
|---|---|---|
| TW | 201446039 A | 12/2014 |
| WO | WO-2012111993 A2 | 8/2012 |
| WO | WO-2012134530 A1 | 10/2012 |
| WO | WO-2012138091 A2 | 10/2012 |
| WO | WO-2012167106 A1 | 12/2012 |
| WO | WO-2014158235 A1 | 10/2014 |
| WO | WO-2014158264 A1 | 10/2014 |
| WO | WO-2014158268 A1 | 10/2014 |
| WO | WO-2014158274 A1 | 10/2014 |

OTHER PUBLICATIONS

"Discussion and Recommendation for D2D channel modelling", NEC Group, R1-130376, 3GPP TSG RAN WG1 Meeting #72, (2013), 1-8.

"International Application Serial No. PCT/US2013/068766, International Search Report mailed Feb. 21, 2014", 3 pgs.

"International Application Serial No. PCT/US2013/068766, Written Opinion mailed Feb. 21, 2014", 5 pgs.

"International Application Serial No. PCT/US2013/077142, International Search Report mailed Apr. 25, 2014", 4 pgs.

"International Application Serial No. PCT/US2013/077142, Written Opinion mailed Apr. 25, 2014", 5 pgs.

"International Application Serial No. PCT/US2013/077255, International Search Report mailed Apr. 21, 2014", 3 pgs.

"International Application Serial No. PCT/US2013/077255, Written Opinion mailed Apr. 21, 2014", 6 pgs.

"International Application Serial No. PCT/US2013/077764, International Search Report mailed Apr. 24, 2014", 3 pgs.

"International Application Serial No. PCT/US2013/077764, Written Opinion mailed Apr. 24, 2014", 4 pgs.

Alcatel-Lucent, et al., "LTE device to device evaluation methodology", R1- 120469, 3GPP TSG-RAN1 Meeting #72, (2013), 1-7.

Miller, K., et al., "Adaptation algorithm for adaptive streaming over HTTP", 2012 19th International Packet Video Workshop (PV), (2012), 173-178.

New Postcom, "Evaluation scenarios and channel models for D2D communications", R1-130154, 3GPP TSG-RAN1 Meeting #72, (2013), 1-5.

Nokia, et al., "On LTE D2D Methodologies and Metrics", R1-130501, 3GPP TSG RAN WG1 Meeting #72, (2013), 1-4.

"Taiwanese Application Serial No. 103111024, Office Action mailed Jul. 23, 2015", 11 pgs.

* cited by examiner

USER EQUIPMENT AND METHOD FOR DISTRIBUTED CHANNEL ACCESS FOR D2D COMMUNICATIONS

PRIORITY CLAIM

This application claims the benefit of priority to U.S. Provisional Patent Application Ser. No. 61/806,821, filed Mar. 29, 2013, which is incorporated herein by reference in its entirety.

TECHNICAL FIELD

Embodiments pertain to wireless communications. Some embodiments relate to device-to-device (D2D) communications in wireless networks including cellular-type networks. Some embodiments relate to channel access and resource allocation in wireless networks for D2D communications. Some embodiments relate to communications between machine-to-machine (M2M) devices. Some embodiments relate to 3GPP LTE networks.

BACKGROUND

D2D communications refers to direct communications between two communication devices (e.g., user equipment (UE)). This is unlike conventional communication in a cellular-type network where communications take place between an enhanced Node B (eNB) (e.g., base station) and the communication devices. In conventional cellular-type networks, the eNB schedules and allocates channel resources. For D2D communications however, the amount of control overhead and delay associated with scheduling and allocating resources for D2D communications by the eNB may be prohibitive. This is particularly an issue in situations with a large volume of D2D communications. Furthermore, in some situations, the eNB may be unavailable for scheduling and allocating resources for D2D communications.

Thus there are general needs for more efficient methods of scheduling and allocating resources for D2D communications in cellular-type networks, such as 3GPP-LTE networks. There are also general needs for methods of scheduling and allocating resources for D2D communications that do not rely on or require an eNB or base station. There are also general needs for methods of scheduling and allocating resources for D2D communications that reduce the amount of control overhead and delay. There are also general needs for methods of scheduling and allocating resources for D2D communications that minimize power consumption for transmission and idle modes, support spatial-reuse and provide for variable size resource allocations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
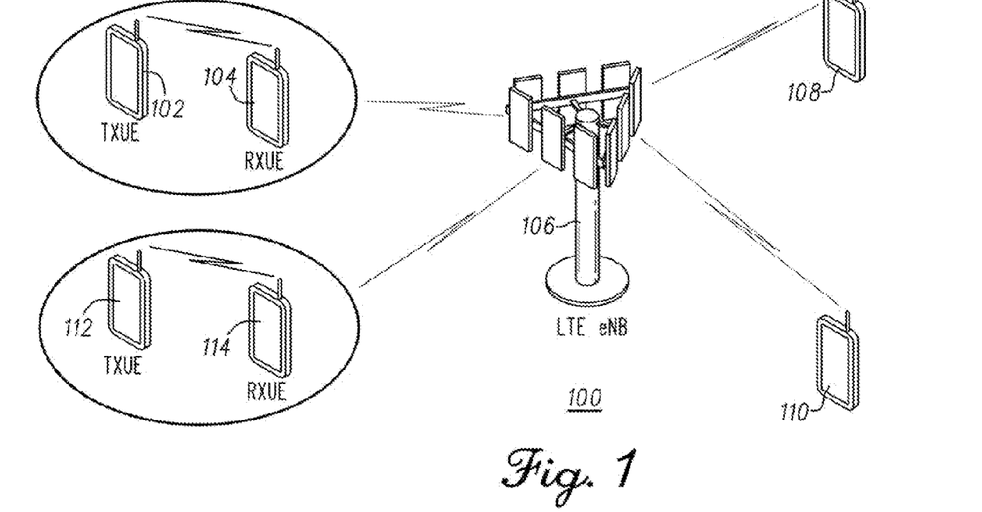
FIG. 1 illustrates a wireless network in accordance with some embodiments.

FIG. 1 illustrates a wireless network in accordance with some embodiments. Wireless network 100 may include an eNB 106 and a plurality of UEs, such as devices 102, 104, 108, 110, 112, and 114. Wireless network 100 may operate as a cellular network, such as a 3GPP LTE network, in which the eNB 106 schedules and allocates channel resources for communications with the UEs (i.e., for non-D2D communication). Some of the UEs may also be configured for D2D communications. For example device 102 and device 104 may perform D2D communication in which device 102 may communicate directly with device 104. Device 112 and device 114 may also perform D2D communication in which device 112 may communicate directly with device 114. In these D2D embodiments, the UE that has data to transmit is referred to as the transmitting device while the UE that is to receive the data is referred to as the receiving device. In accordance with embodiments, a UE may be arranged to perform D2D distributed channel access for the scheduling and allocation of channel resources without involvement of the eNB 106. In these embodiments, a unique connection identifier (CID) may be associated with a one-way link between a pair of UEs (i.e., between a transmitting device and a receiving device).

Figure 2:
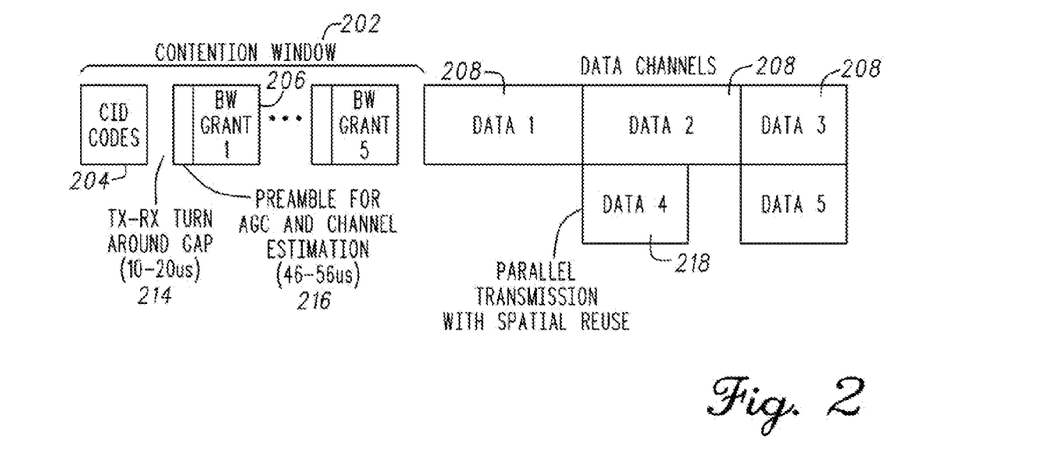
FIG. 2 illustrates distributed channel access in accordance with some embodiments.

FIG. 2 illustrates distributed channel access in accordance with some embodiments. In these embodiments, a UE, when acting as a transmitting device (e.g., device 102 (FIG. 1)), may be arranged to transmit a CID code 204 at a beginning of a contention window 202 to request channel access for a D2D transmission to a receiving device 104 (FIG. 1). In these embodiments the links for D2D transmissions from a transmitting device to a receiving device are identified by a CID and each CID may be mapped to a CID code 204.

In these embodiments, a UE, when acting as a receiving device 104, may transmit a bandwidth grant 206 in response to receipt of a CID code 204 associated with the receiving device 104. The bandwidth grant 206 may be transmitted during the contention window 202, along with bandwidth grants for other CIDs, in an order based on a priority level of the CID. A UE operating as a transmitting device 102 may receive signals during the contention window 202 to identify a bandwidth grant 206 with an associated CID. In response to a bandwidth grant 206, the transmitting device 102 may transmit data 208 during the particular channel resources allocated in the bandwidth grant.

In these embodiments, scheduling and channel allocation for D2D communications may be performed in a distributed matter (i.e., by the UEs rather than centrally by the eNB 106). This may reduce and/or eliminate the control overhead and delay associated with conventional scheduling and channel allocation techniques performed by an eNB, such as eNB 106. For example, the use of only a CID code for a bandwidth request significantly reduces bandwidth requirements. Furthermore, overhead associated with turn-around time is reduced since the bandwidth grants 206 occur after all of the bandwidth requests (i.e., represented by CID codes 204). This is unlike some conventional techniques for contention-based scheduling in which each bandwidth grant follows an associated bandwidth request requiring overhead for turn-around time.

As discussed above, a CID is associated with a one-way link between a transmitting device and a receiving device. A different CID may be associated with a link in the opposite direction between the same UEs. In some embodiments, the CID may identify the devices and may include a device address of both the transmitting device and the receiving device, although this is not a requirement. In some embodiments, the CID may comprise a shortened identifier (e.g., shorter than both device addresses) that identifies the device addresses of both the UEs (i.e., instead of a longer identifier that may include a complete device addresses of both the UEs).

In accordance with some embodiments, each CID may be mapped to (or associated with) a priority level. When acting as a receiving device 104, a UE may be arranged to identify any other CID codes 204 received at the beginning of the contention window 202 and sort the received CID codes 204 based on the priority level to determine when to transmit a bandwidth grant 206. The UE may wait for transmission of any bandwidth grants 206 associated with higher priority CIDs before transmitting its bandwidth grant 206.

In these embodiments, other receiving devices may also transmit bandwidth grants 206 during non-interfering portions of the contention window 202 in the order based on the priority level of their CID. The position of the bandwidth grant 206 for a particular transmitting device is not fixed so a transmitting device may listen to (e.g., monitor) the bandwidth grants for other transmitting devices at least until it receives its bandwidth grant. In some situations, there may not be a bandwidth grant for each transmitting device that requests a bandwidth grant.

In some embodiments, when acting as a transmitting device 102, a UE may be arranged to transmit a CID code 204 at a predetermined power level at the beginning of the contention window 202 to request channel access. The predetermined power level may be a high power level, a highest power level, or a full power level. The transmission of the CID code 204 at a high power level may help allow the CID code to be detected by other UEs.

In some embodiments, the CID code 204 is transmitted concurrently with CID codes 204 of any other transmitting devices that are also requesting channel access. In some of these embodiments, the CID codes 204 may comprise orthogonal sequences or pseudo-orthogonal sequences and may have a low correlation with respect to each other. In some embodiments, the CID codes 204 may be CDMA-like codes, although this is not a requirement as other types of codes may be used.

In some embodiments, a CID code 204 may be transmitted on different time-frequency resources than the CID codes transmitted by other transmitting devices that are also requesting channel access. In some of these embodiments, the CID codes may be transmitted in different resource blocks (RBs). In these embodiments, certain time-frequency resources may be designated (e.g., by an eNB 106) for D2D communications including transmission of CID codes for requesting channel access.

In some embodiments, when acting as a receiving device 104, a UE may monitor bandwidth grants 206 transmitted from other receiving devices having higher priority CIDs to determine remaining channel resources for allocation to an associated transmitting device. The UE may grant bandwidth to its associated transmitting device when sufficient channel resources remain and may refrain from granting bandwidth to the associated transmitting device when insufficient channel resources remain. In these embodiments, the particular channel resources available for D2D data communication may be pre-designated by an eNB 106 and known to UEs that engage in D2D communications.

In some embodiments, when acting as a receiving device having a highest priority CID, a UE may allocate channel resources (i.e., grant bandwidth) prior to allocation of channel resources by other receiving devices. When acting as a receiving device 104 and when associated with a lower priority CID, a UE may refrain from transmitting a bandwidth grant 206 when insufficient channel resources are available after allocation of channel resources by receiving devices with higher priority CIDs.

In these embodiments, by listening to and decoding bandwidth grants 206 that are transmitted by other receiving devices (i.e., having higher priority CIDs), a receiving device 104 is able to determine the amount of available bandwidth (if any is available) that may be granted to its associated transmitting device 102. In some of these embodiments, bandwidth grants may grant amounts of bandwidth that are variable in size (e.g., a variable number of resource blocks may be allocated).

In some embodiments, when acting as a receiving device 104, a UE may determine a recommended transmission power level for transmission of data 208 based, at least in part, on signal strengths of the CID codes 204 received from one or more transmitting devices. The receiving device 104 may provide the recommended transmission power level to the associated transmitting device 102 in the bandwidth grant 206. In these embodiments, the data 208 may be transmitted by a transmitting device in the time-frequency resources allocated in a corresponding bandwidth grant 206. In some embodiments illustrated in FIG. 2, Data 1 may be transmitted within the time-frequency resources allocated in bandwidth (BW) Grant 1, Data 2 may be transmitted within the time-frequency resources allocated in BW Grant 2, and so forth.

In some embodiments, when acting as a receiving device 104, a UE may include bandwidth allocation parameters and a recommended transmission power level in a transmitted bandwidth grant 206. The bandwidth allocation parameters may include a starting point (or an offset value) for the resource allocation. The bandwidth allocation parameters may also include a resource allocation size, which may be indicated, for example, as a number of resource blocks. The UE may optionally include one or more of a modulation and coding scheme (MCS) and a CID of a spatial-reuse pair when spatial-reuse pairing is performed. Spatial-reuse pairing is discussed in more detail below.

In these embodiments, the bandwidth grant 206 may be arranged to grant channel resources of variable size (e.g., a variable number of RBs depending on availability). This can allow data transmissions 208 to be of variable length.

In some embodiments, instead of a bandwidth grant 206, a rejection of the bandwidth request may be transmitted and no channel resources may be granted. In some embodiments, a bandwidth grant 206 with empty fields or one or more other indicators may be used as a rejection of an associated bandwidth request.

In some embodiments, when acting as a transmitting device 102, a UE may enter a sleep/low-power state after being in an active state during the contention window 202 and may wake-up from the sleep/low-power state to transmit data 208 to an associated receiving device during the channel resources indicated in the bandwidth grant 206. The UE may return to the sleep/low-power state during data transmissions of any other transmitting devices.

In these embodiments, when acting as a receiving device 104, a UE may enter a sleep/low-power state after the contention window 202, wake-up to receive data 208 from an associated transmitting device during the channel resources indicated in the bandwidth grant 206. The UE may return to the sleep/low-power state during data transmissions of any other transmitting devices. In these embodiments, both a transmitting and a receiving device may be in an active state during the contention window.

As illustrated in FIG. 2, a TX-RX turn-around gap 214 may be provided between the transmitted CID codes 204 and the bandwidth grants 206. An interval between two consecutive bandwidth grants may also be provided. In these embodiments, the TX-RX turn-around gap 214 and the interval between consecutive bandwidth grants may be pre-configured in each device or configured by the eNB 106. In some embodiments, the TX-RX turn-around gap 214 may range from ten to twenty microseconds, for example, although this is not a requirement.

In some embodiments, a preamble 216 may be transmitted prior to each bandwidth grant 206. The preamble 216 may be used for automatic gain control (AGC) and channel estimation and may range from 46 to 56 microseconds, for example.

In some embodiments, the size of the contention window 202 may be either fixed or dynamic. If dynamic, the contention window 202 may have a maximum size. In some embodiments in which the size of the contention window is dynamic, when the contention ends (e.g., fewer request/grants) before a maximum size is reached, the data transmission may begin almost immediately after the contention window.

In accordance with some embodiments, each CID may be mapped to a unique priority level so that the CIDs can be sorted based on the priority order. A receiving device of a link with a higher priority CID may respond sooner than a receiving device associated with a link with a lower priority CID. For example, an addressed receiving device with the highest link priority may respond to its transmitting device first. An addressed receiving device with a lower priority CID may wait for other receiving devices with higher priority CIDs to respond unless a higher priority receiving device asks the lower priority receiving device to respond earlier (e.g., right after the higher priority one). In some embodiments, the mapping relation between a CID and priority level may be generated for fairness and/or quality of service. In some embodiments, the mapping relation may be randomized periodically to help ensure that device pairs have equal opportunity to access the channel.

In accordance with some embodiments, upon detecting the CID codes 204, each receiving device may measure the strengths of the received signals from its associated transmitting device and the other transmitting devices for estimating an optimal transmission power for its transmitting device to send a subsequent data burst during the allocated resources. All addressed receiving devices may respond with bandwidth grants 206 one by one in the priority order. When one receiving device transmits a bandwidth grant 206, the other transmitting devices and receiving devices with lower priority CIDs may be arranged to listen to these bandwidth grant message to decide what to do.

In some embodiments, when there is no prior information stored in the receiving device's memory (e.g., at the first time, when the receiving device detects its CID code), a default amount of resource bandwidth may be allocated or granted. In some embodiments, additional bandwidth requests from the transmitting device may be piggybacked in a data packet and stored in the receiving device's memory for latter bandwidth grants. These embodiments may simplify the bandwidth request message to only a CID code because a default amount of channel resource may be granted for the initial data transmission and an additional amount of channel resource may be specified latter using an efficient modulation and/or coding scheme. If the receiving device knows about the requested bandwidth from the memory, it can grant more than the default amount of bandwidth when it receives a subsequent bandwidth request.

In some embodiments, upon receiving the bandwidth grants 206 transmitted by other receiving devices, each receiving device with a lower priority may remove the responded links with the highest priorities from the current priority list and may look for available resource within an entire data resource block. For example, the receiving device may calculate how much channel resource is remaining and where the resources are located. If there is enough channel resource remaining, the receiving device may continue the allocation. Otherwise, the receiving device may terminate the bandwidth grant procedure at the receiving device side. Once a receiving device has a higher priority in the current priority list, it gets the chance to grant the resource to its transmitting device. This chance may be overwritten by a receiving device with a higher priority. The receiving device may specify in the bandwidth grant 206 that another receiving device should take the next grant chance. The receiving device may also reject a request by sending a response when there is not enough resource. Since the size of the contention window 202 may be limited, the number of bandwidth grants 206 may also be limited resulting in another termination condition since any additional bandwidth grants 206 would be outside of the contention window 202.

In some embodiments, after the contention window 202, the transmitting device and the receiving device may wake up at the specified time, the transmitting device may transmit data packets in the allocated time-frequency channel resources (e.g., in the allocated resource blocks) using the specified transmit power for the specified duration. The other transmitting devices and receiving devices that are not allocated resources during that resource allocation may go into sleep mode to save power until their turns come up. Accordingly, devices with no data communications only need to wake up during the contention window 202 and can go to sleep in the rest of the time. This saves power compared to conventional networks, such as a Wi-Fi network with burst contentions.

In some embodiments, a UE may be configured for spatial-reuse in which data, such as data 218 (Data 4) is transmitted concurrently with data 208 (Data 2) on non-orthogonal channel resources (e.g., the same or at least partially-overlapping channel resources).

In some of these embodiments, a receiving device having a higher priority CID may identify a pair of devices with a lower priority CID as a spatial-reuse pair. For example, referring to FIG. 1, transmitting device 102 and receiving device 104 may have a higher priority CID than transmitting device 112 and receiving device 114. In these embodiments, receiving device 104 may identify transmitting device 112 and receiving device 114 as a spatial-reuse pair of devices.

In these embodiments, transmitting device 112 may transmit data 218 (Data 4) to receiving device 114 concurrently with the transmission of data 208 (Data 2) which is being transmitted from transmitting device 102 to receiving device 104. In these spatial-reuse embodiments, the spatial-reuse data transmission (i.e., data 218) may be associated with a lower priority CID and may be transmitted concurrently (i.e., in parallel) with data (e.g., Data 2) associated with a higher priority CID on the same or partially-overlapping channel resources.

In these spatial-reuse embodiments, a UE that is configured for spatial-reuse and is acting as a receiving device (e.g., receiving device 114) with a lower priority CID may be arranged to determine a recommended transmission power level (or power level limit) for a spatial-reuse data transmission (i.e., data 218). The spatial-reuse data transmission may be transmitted in accordance with a spatial-reuse technique by the transmitting device 112. In some of these spatial-reuse embodiments, the recommend transmission power level or limit for the spatial-reuse data transmission may be determined based on an interference estimate to help avoid interference and assure a reliable reception of the data 208 by a higher priority receiving device (e.g., receiving device 104) of the spatial-reuse pair. These embodiments are discussed in more detail below.

Figure 3A:
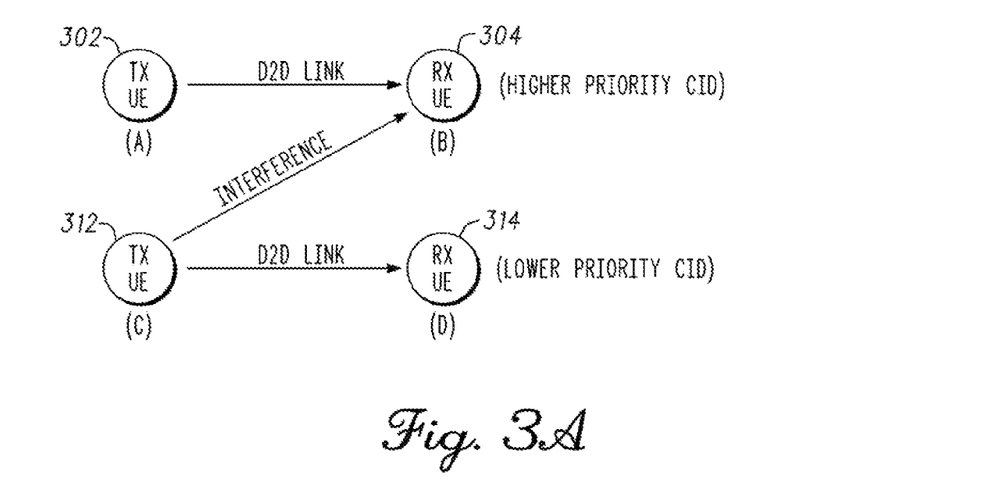
FIGS. 3A and 3B illustrate transmission power level selection for interference avoidance in accordance with some embodiments.
Figure 3B:
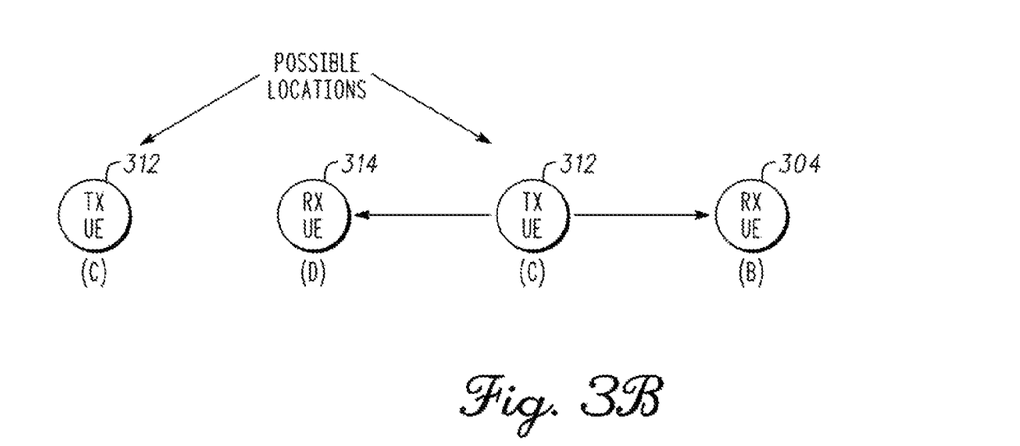

FIGS. 3A and 3B illustrate transmission power level selection for interference avoidance in accordance with some embodiments. In these embodiments, transmitting device 302 and receiving device 304 may have a higher-priority CID than transmitting device 312 and receiving device 314. In these embodiments, receiving device 304 may identify transmitting device 312 and receiving device 314 as a spatial-reuse pair.

In these embodiments, the UE 314 may be arranged to determine a recommended transmission power level or limit for a spatial-reuse data transmission (e.g., data 218) (i.e., in accordance with a spatial-reuse technique) by the associated transmitting device 312. The spatial-reuse data transmission (data 218) may be transmitted concurrently with data (e.g., Data 2) of a higher priority CID (devices 302-304) on non-orthogonal channel resources. The recommend transmission power level for the spatial-reuse transmission may be determined by receiving device 314 based on an interference estimate to help assure a reliable reception of the data 208 by the receiving device 302 with the higher priority CID of the spatial-reuse pair.

In some embodiments, to determine the recommended transmission power level (or power level limit) for the spatial-reuse data transmission 218, the receiving device 314 may estimate the path loss between the transmitting device 302 and the receiving device 304 of the higher priority CID based on the CID code and the bandwidth grant 206 transmitted by the devices having the higher-priority CID. The recommended transmission power level for the spatial-reuse data transmission 218 may be determined based on the estimated path loss and an interference threshold of the receiving device 304 having the higher-priority CID. In these embodiments, the receiving device 314 having the lower-priority CID may provide the recommended transmission power level in its bandwidth grant message 206 to transmitting device 312.

To support spatial-reuse, which refers to more than one pair of devices that transmit and/or receive simultaneously, an estimate of interference may be used. As shown in FIG. 3A, there are two pairs of devices, one pair including transmitting device 302 (TX UE A) and receiving device 304 (RX UE B), and one pair including transmitting device 312 (TX UE C) and receiving device 314 (RX UE D).

As mentioned above, the receiving device 314 may select the transmit power for its transmitting device 312 and may indicate the power in the bandwidth allocation parameters. In some embodiments, the transmit power level or limit may be selected to meet a signal-to-noise ratio (SNR) requirement plus a margin against potential interference. The margin may be known to all devices. One selection method of transmit power is, e.g. $P(A)=PL(AB)+Prequire(AB)+Margin$, where Prequire(AB) is the required receive power level at receiver Rx B to detect modulated signal meeting specified block error rate (BER), P(A) is the transmit power of A, and PL(AB) is the path loss between A and B that may be estimated from the measured CID and bandwidth grant signals.

For spatial-reuse, the transmitting device 312 may be arranged to avoid interference with the scheduled pairs having higher priority CIDs and may be arranged to avoid interference with normal uplink reception by the eNB 106 (FIG. 1). In some embodiments, when the receiving device 314 doesn't know the location of the associated transmitting device 312, the receiving device 314 may assume a worst case scenario for selection of transmit power for the transmitting device 312. For example, as shown in FIG. 3B, receiving device Rx D computes the transmit power for its transmitting device Tx C. Since the link Tx A-Rx B has been scheduled with a higher priority, Rx D has to control Tx C's transmit power such that Tx C's interference to Rx B is below a certain threshold. Because Rx D doesn't know Tx C's location with respect to Rx B, Rx D may assume that Tx C is located between Rx B and Rx D as a worst case scenario. The worst path loss between Tx C and Rx B may be computed from the measurements of the CID code sent by Tx C and the bandwidth grant sent by Rx B, which is $PLworst(CB)=PL(BD)-PL(CD)$. Therefore, Tx C's transmit power may be computed as $P(C)-PLworst(CB)<Margin$ and $P(C)>=PL(CD)+Prequire(CD)$, where Margin is the interference threshold for Rx B's reliable reception.

Figure 4:
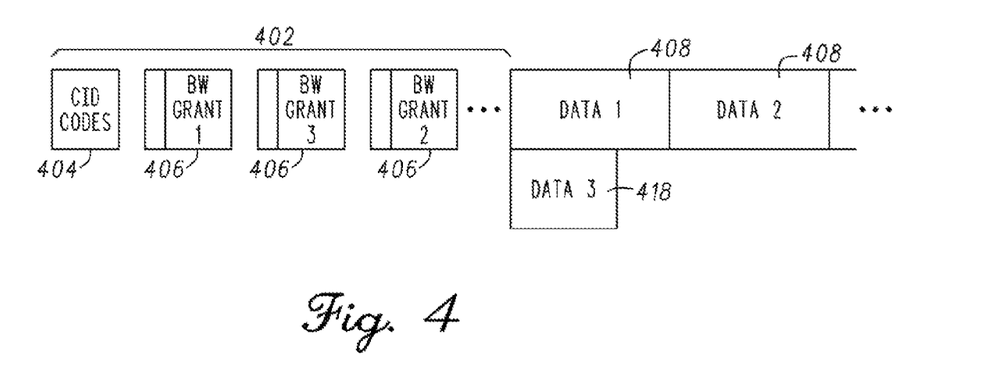
FIG. 4 illustrates spatial-reuse pairing in accordance with some embodiments.

FIG. 4 illustrates spatial-reuse pairing in accordance with some embodiments. As shown in FIG. 4, CID codes 404 may be transmitted at the beginning of the contention window 402 followed by bandwidth grants 406 during the contention window 402. After the contention window 402, data 408 may be transmitted.

In some spatial-reuse embodiments, a UE that is configured for spatial-reuse and is acting as a receiving device 304 may be arranged to select a pair of UEs having a lower priority CID as a spatial-reuse pair based on potential interference and provide the CID of the selected spatial-reuse pair in its bandwidth grant 206. The lower priority receiving device 314, in response to reception of the bandwidth grant sent by the higher priority receiving device 304 may transmit a bandwidth grant (i.e., BW Grant 3) immediately following the bandwidth grant (i.e., BW Grant 1) sent by the higher priority receiving device 304. As illustrated in FIG. 4, BW Grant 3 for spatial-reuse pairing may be sent out-of-order (i.e., before BW Grant 2). In these embodiments, the lower priority transmitting device 312 is arranged to transmit spatial-reuse data 418 (Data 3) concurrently with data 408 (Data 1) of the higher priority transmitting device 302.

In these spatial-reuse pairing embodiments, the bandwidth grant 406 (BW Grant 1) may also include a CID of a selected spatial-reuse pair (i.e. for next receiving device for granting bandwidth). In these embodiments, the higher priority receiving device 304 may select a spatial-reuse pair of UEs which is determined to have either minimal interference or a tolerable level of interference with the higher priority receiving device 304 during simultaneous transmission. In these embodiments, the higher priority receiving device 304 is effectively asking the second lower priority receiving device (i.e., receiving device 314) to send a bandwidth grant (i.e., BW Grant 3) immediately after its bandwidth grant (i.e., BW grant 1) using a next-one indicator. In some embodiments, a spatial-reuse data transmission 418 (Data 3) may have a shorter duration than data 408 (Data 1) to help avoid any impact with the data of the higher priority CID (i.e., Data 1).

In some of these spatial-reuse pairing embodiments, the receiving device with a higher priority CID may select a lower-priority pair of devices with minimal interference from all candidates as a spatial-reuse pair and indicate the CID of selected device pair in the bandwidth grant message. Since the interference information is locally measured in a distributed system, there may be no central control. After one link is scheduled, the receiving device on the link may have the best knowledge about which link among all links that can spatially reuse the channel with the scheduled one. Therefore, in some embodiments, the last scheduled receiving device may change the priority order of the other devices since the old priority order doesn't take the interferences of the already scheduled links into account.

In some embodiments, channel allocation for spatial-reuse may be done in a single bandwidth grant message (i.e., piggybacked) by the higher-priority receiver (i.e., to save a slot), although this is not a requirement. Because there is the CID of spatial-reuse pair, such a piggyback technique may be optional.

Upon receiving such a bandwidth grant message that includes a CID of a selected spatial-reuse pair, the receiving device of the selected spatial-reuse pair may take the next immediate bandwidth grant slot to send its grant message. The receiving device that would have had that slot by default may be arranged to give up its slot or back off one slot.

In embodiments when the default receiving device is arranged back off one slot, it may send its bandwidth grant in the next slot. For example, device pair Tx3-Rx3 may be picked by the Rx1 as spatial-reuse pair and may be indicated in BW Grant 1. In response, Rx3 transmits its bandwidth grant (BW grant 3) immediately following bandwidth grant by Rx1 (BW Grant 1) as illustrated in FIG. 4. Rx2 backs off one slot and transmits its bandwidth grant (BW grant 2) after BW Grant 3. In the data channel, Tx3 may transmit data (Data 3) during the same time-frequency block with Tx1 (Data 1).

Figure 5:
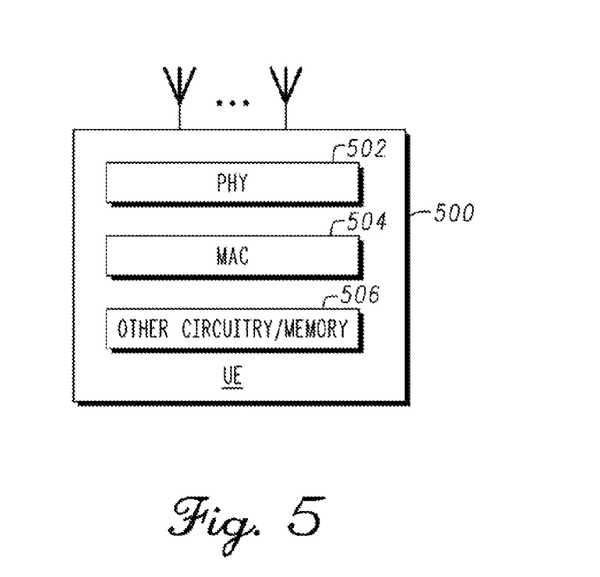
FIG. 5 is a block diagram of a UE in accordance with some embodiments.

FIG. 5 is a block diagram of a UE in accordance with some embodiments. UE 500 may include physical-layer (PHY) circuitry 502, media-access control layer (MAC) circuitry 504, other processing circuitry and memory 506, as well as other components and elements. PHY circuitry 502 may be arranged for transmitting and receiving signals through a wireless medium using one or more antennas and MAC circuitry 504 may be arranged for controlling access to the wireless medium.

In accordance with embodiments, the PHY circuitry 502 and the MAC circuitry 504 may be arranged to perform distributed channel access for D2D communications as described herein. In some embodiments, the PHY circuitry 502 and the MAC circuitry 504 may be configured to transmit a CID code at a beginning of a contention window to request channel access for a D2D transmission to a receiving device. The PHY circuitry 502 and the MAC circuitry 504 may be arranged to receive a bandwidth grant from the receiving device during the contention window, along with bandwidth grants for other CIDs, in an order based on a priority level of the CID. The PHY circuitry 502 and the MAC circuitry 504 may be arranged to transmit data after reception of the bandwidth grants in time-frequency resources indicated in an associated one of the bandwidth grants.

In some embodiments, UE 500 may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 500 may be a machine-to-machine (M2M) communication device that operates autonomously instead of a mobile device operated by a user.

Antennas may comprise one or more directional or omni-directional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting device. In some embodiments, a M2M device may utilize a single antenna.

In some embodiments, UE 500 may include one or more of a keyboard, a display, a non-volatile memory port, multiple antennas, a graphics processor, an application processor, speakers, and other mobile device elements. The display may be an LCD screen including a touch screen.

In some embodiments, the PHY circuitry 502 and the MAC circuitry 504 may be configured to communicate orthogonal-frequency division multiplexed (OFDM) communication signals over a multicarrier communication channel. The OFDM signals may comprise a plurality of orthogonal subcarriers. In some broadband multicarrier embodiments, UE 500 may be a 3rd Generation Partnership Project (3GPP) Universal Terrestrial Radio Access Network (UTRAN) Long-Term-Evolution (LTE) or a Long-Term-Evolution (LTE) communication station, although the scope of the invention is not limited in this respect. In these broadband multicarrier embodiments, the UE 500 may be configured to communicate in accordance with an orthogonal frequency division multiple access (OFDMA) technique.

In an example, user Equipment (UE) arranged to perform device-to-device (D2D) distributed channel access in an 3GPP-LTE network, the UE having physical-layer (PHY) circuitry and media-access control (MAC) layer circuitry arranged to transmit a connection identifier (CID) code at a beginning of a contention window to request channel access for a D2D transmission to a receiving device, wherein links for D2D transmissions from a transmitting device to a receiving device are identified by CID and each CID is mapped to a CID code; receive a bandwidth grant from the receiving device, the bandwidth grant being transmitted by the received device in response to receipt of a CID code associated with the receiving device, the bandwidth grant being transmitted during the contention window, along with bandwidth grants for other CIDs, in an order based on a priority level of the CID; and transmit data after reception of the bandwidth grants in time-frequency resources indicated in an associated one of the bandwidth grants.

In another example, when acting as a receiving device, the UE is further arranged to: identify other CID codes received at the beginning of the contention window; sort the received CID codes based on the priority level to determine when to transmit a bandwidth grant; and wait for transmission of any other bandwidth grants associated with higher priority CIDs before transmitting the bandwidth grant.

In another example, the UE, when acting as a transmitting device, is arranged to transmit the CID code at a predetermined power level at the beginning of the contention window to request channel access, the predetermined power level determined to allow the CID code to be detected by other devices in addition to the receiving device.

In another example, the CID code is transmitted concurrently with CID codes of other transmitting devices that are also requesting channel access.

In another example, the CID code is transmitted on different time-frequency resources than CID codes transmitted by other transmitting devices that are also requesting channel access.

In another example, the CID codes 204 comprise pseudo-orthogonal sequences, and the transmitting device is arranged to transmit a CID code on the same time-frequency resources as CID codes that are transmitted by other transmitting devices that are also requesting channel access.

In another example, when acting as a receiving device, the UE is arranged to: monitor bandwidth grants transmitted from other receiving devices having higher priority CIDs to determine remaining channel resources for allocation to an associated transmitting device; grant bandwidth to the transmitting device when sufficient channel resources remain; and refrain from granting bandwidth to the transmitting device when insufficient channel resources remain.

In another example, when acting as a receiving device having a highest priority CID, allocate channel resources prior to allocation of channel resources by other receiving devices, and when acting as a receiving device and when associated with a lower priority CID, the UE is arranged to refrain from transmitting a bandwidth grant when insufficient channel resources are available after allocation of channel resources by receiving devices with higher priority CIDs.

In another example, when acting as a receiving device, the UE is arranged to determine a recommended transmission power level for transmission of data based, at least in part, on signal strengths of the CID codes received from one or more transmitting devices, and wherein the receiving device is to provide the recommended transmission power level to the associated transmitting device in a transmitted bandwidth grant.

In another example, when acting as a receiving device, the UE is arranged to include bandwidth allocation parameters including at least one of a starting point or offset value, a resource allocation size and the recommended transmission power level in a transmitted bandwidth grant, and when spatial-reuse pairing is performed, a CID of a spatial-reuse pair and optionally bandwidth allocation parameters for the spatial-reuse pair are piggybacked in the transmitted bandwidth grant.

In another example, when acting as a transmitting device, the UE is arranged to: enter a sleep/low-power state after the contention window; wake-up to transmit data to an associated receiving device during channel resources indicated in a bandwidth grant; and return to the sleep/low-power state during data transmissions of other transmitting devices.

In another example, the UE is configured for spatial-reuse and is acting as a receiving device, the UE is arranged to determine a recommended transmission power level for a spatial-reuse data transmission by an associated transmitting device, wherein the spatial-reuse data transmission is transmitted concurrently with data of a higher priority CID on non-orthogonal time-frequency resources, and wherein the recommend transmission power level for the spatial-reuse transmission is determined based on an interference estimate to help assure a reliable reception of the data by a higher priority receiving device of the spatial-reuse pair.

In another example, determining the recommended transmission power level for the spatial-reuse data transmission comprises: estimating a path loss between the transmitting device and the receiving device of the higher priority CID based on the CID code and the bandwidth grant transmitted by the devices having the higher-priority CID, and wherein the recommended transmission power level for the spatial-reuse data transmission is determined based on the estimated path loss and an interference threshold of the receiving device having the higher-priority CID.

In another example, when the UE is configured for spatial-reuse and is acting as a receiving device, the receiving device is arranged to: select a pair of UEs having a lower priority CID as a spatial-reuse pair based on potential interference; and provide the CID of the selected spatial-reuse pair in the bandwidth grant, wherein a lower priority receiving device, in response to reception of the bandwidth grant sent by the higher priority receiving device, is arranged to transmit a bandwidth grant immediately following the bandwidth grant sent by the higher priority receiving device, and wherein the lower priority transmitting device is arranged to transmit a spatial-reuse data transmission concurrently with data of the higher priority transmitting device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) arranged to perform device-to-device (D2D) distributed channel access in a 3GPP-LTE network, the UE having physical-layer (PHY) circuitry and media-access control (MAC) layer circuitry arranged to:
   transmit a connection identifier (CID) code at a beginning of a contention window to request channel access for a D2D transmission to a receiving device, wherein links for D2D transmissions from a transmitting device to a receiving device are identified by a CID and each CID is mapped to a CID code, wherein CID codes are configured to be transmitted concurrently at the beginning of the contention window by transmitting devices requesting an allocation of channel resources for a D2D transmission;
   receive a bandwidth grant from the receiving device, the bandwidth grant being transmitted by the receiving device in response to receipt of a CID code associated with the receiving device, the bandwidth grant being received during the contention window, along with bandwidth grants, transmitted by other receiving devices for other CIDs, the bandwidth grants being received sequentially during the contention window in an order based on a priority level of the CID, the priority level used by receiving devices to allocate bandwidth on a shared data channel to transmitting devices; and
   transmit data after reception of the bandwidth grants in time-frequency resources of the shared data channel indicated in an associated one of the bandwidth grants.

2. User Equipment (UE) arranged to perform device-to-device (D2D) distributed channel access in a 3GPP-LTE network, the UE having physical-layer (PHY) circuitry and media-access control (MAC) layer circuitry arranged to:
   transmit a connection identifier (CID) code at a beginning of a contention window to request channel access for a D2D transmission to a receiving device, wherein links for D2D transmissions from a transmitting device to a receiving device are identified by CID and each CID is mapped to a CID code;
   receive a bandwidth grant from the receiving device, the bandwidth grant being transmitted by the received device in response to receipt of a CID code associated with the receiving device, the bandwidth grant being transmitted during the contention window, along with bandwidth grants for other CIDs, in an order based on a priority level of the CID; and
   transmit data after reception of the bandwidth grants in time-frequency resources indicated in an associated one of the bandwidth grants, wherein when acting as a receiving device, the UE is further arranged to:
identify other CID codes received at the beginning of the contention window;
sort the received GID codes based on the priority level to determine when to transmit a bandwidth grant; and
wait for transmission of any other bandwidth grants associated with e priority CIDs before transmitting the bandwidth grant.

3. The UE of claim 2 wherein the UE, when acting as a transmitting device, is arranged to transmit the CID code at a predetermined power level at the beginning of the contention window to request channel access, the predetermined power level determined to allow the CID code to be detected by other devices in addition to the receiving device.

4. The LE of claim 2 wherein the CID code is transmitted concurrently with CID codes of other transmitting devices that are also requesting channel access.

5. The UE of claim 2 wherein the CID code is transmitted on different time-frequency resources than CID codes transmitted by other transmitting devices that are also requesting channel access.

6. The UE of claim 2 wherein the CID codes 204 comprise pseudo-orthogonal sequences, and
wherein the transmitting device is arranged to transmit a CID code on the same time-frequency resources as CID codes that are transmitted by other transmitting devices that are also requesting channel access.

7. The UE of claim 2 wherein when acting as a receiving device, the UE is arranged to:
monitor bandwidth grants transmitted from other receiving devices having higher priority CIDs to determine remaining channel resources for allocation to an associated transmitting device;
grant bandwidth to the transmitting device when sufficient channel resources remain; and
refrain from granting bandwidth to the transmitting device when insufficient channel resources remain.

8. The UE of claim 7 wherein when acting as a receiving device having a highest priority CID, allocate channel resources prior to allocation of channel resources by other receiving devices, and
wherein when acting as a receiving device and when associated with a lower priority CID, the UE is arranged to refrain from transmitting a bandwidth grant when insufficient channel resources are available after allocation of channel resources by receiving devices with higher priority CIDs.

9. The UE of claim 8 wherein when acting as a receiving device, the UE is arranged to determine a recommended transmission power level for transmission of data based, at least in part, on signal strengths of the CID codes received from one or more transmitting devices, and
wherein the receiving device is to provide the recommended transmission power level to the associated transmitting device in a transmitted bandwidth grant.

10. The HE of claim 9 wherein when acting as a receiving device, the UE is arranged to include bandwidth allocation parameters including at least one of a starting point or offset value, a resource allocation size and the recommended transmission power level in a transmitted bandwidth grant, and
when spatial-reuse pairing is performed, a CID of a spatial-reuse pair and optionally bandwidth allocation parameters for the spatial-reuse pair are piggybacked in the transmitted bandwidth grant.

11. The UE of claim 1 wherein when acting as a transmitting device, the UE is arranged to:

enter a sleep/low-power state after the contention window;
wake-up to transmit data to an associated receiving device during channel resources indicated in a bandwidth grant; and
return to the sleep/low-power state during data transmissions of other transmitting devices.

12. The UE of claim 1, wherein when the UE is configured for spatial-reuse and is acting as a receiving device, the UE is arranged to determine a recommended transmission power level for a spatial-reuse data transmission by an associated transmitting device,
wherein the spatial-reuse data transmission is transmitted concurrently with data of a higher priority CID on non-orthogonal time-frequency resources, and
wherein the recommend transmission power level for the spatial-reuse transmission is determined based on an interference estimate to help assure a reliable reception of the data by a higher priority receiving device of the spatial-reuse pair.

13. The UE of claim 12 wherein determining the recommended transmission power level for the spatial-reuse data transmission comprises:
estimating a path loss between the transmitting device and the receiving device of the higher priority CID based on the CID code and the bandwidth grant transmitted by the devices having the higher-priority CID, and
wherein the recommended transmission power level for the spatial-reuse data transmission is determined based on the estimated path loss and an interference threshold of the receiving device having the higher-priority CID.

14. The UE of claim 12 wherein when the UE is configured for spatial-reuse and is acting as a receiving device, the receiving device is arranged to:
select a pair of UEs having a lower priority CID as a spatial-reuse pair based on potential interference; and
provide the CID of the selected spatial-reuse pair in the bandwidth grant,
wherein a lower priority receiving device, in response to reception of the bandwidth grant sent by the higher priority receiving device is arranged to transmit a bandwidth grant immediately following the bandwidth grant sent by the higher priority receiving device, and
wherein the lower priority transmitting device is arranged to transmit a spatial-reuse data transmission concurrently with data of the higher priority transmitting device.

15. A method performed by user equipment (UE) for distributed channel access for device-to-device (D2D) communication in a 3GPP LTE network, the method comprising:
transmitting a connection identifier (CID) code at a beginning of a contention window to request channel access for a D2D transmission to a receiving device, wherein links for D2D transmissions from a transmitting device to a receiving device are identified by CID and each CID is mapped to a CID code, wherein CID codes are configured to be transmitted concurrently at the beginning of the contention window by transmitting devices requesting an allocation of channel resources for a D2D transmission;
receiving a bandwidth grant from the receiving device, the bandwidth grant being transmitted by the receiving device in response to receipt of a CID code associated with the receiving device, the bandwidth grant being received during the contention window, along with bandwidth grants, transmitted by other receiving devices, for other CIDs, the bandwidth grants being received sequentially during the contention window in an order based on a priority level of the CID, the priority level used by receiving devices to allocate bandwidth on a shared data channel to transmitting devices; and transmitting data after reception of the bandwidth grants in time-frequency resources of the shared data channel indicated in an associated one of the bandwidth grants.

16. The method of claim 15 wherein when acting as a receiving device, the method further includes:

identifying other CID codes received at the beginning of the contention window;

sorting the received CID codes based on the priority level to determine when to transmit a bandwidth grant; and waiting for transmission of any other bandwidth grants associated with higher priority CIDs before transmitting the bandwidth grant.

17. The method of claim 16 wherein when acting as a receiving device, the method further includes monitoring bandwidth grants transmitted from other receiving devices having higher priority CIDs to determine remaining channel resources for allocation to an associated transmitting device; granting bandwidth to the transmitting device when sufficient channel resources remain; and refraining from granting bandwidth to the transmitting device when insufficient channel resources remain.

18. The method of claim 17 wherein when acting as a receiving device having a highest priority CID, the method includes allocating channel resources prior to allocation of channel resources by other receiving devices, and wherein when acting as a receiving device and when associated with a lower priority CII), the method includes refraining from transmitting a bandwidth grant when insufficient channel resources are available after allocation of channel resources by receiving devices with higher priority CIDs.

19. A non-transitory computer-readable storage medium that stores instructions for execution by one or more processors to perform operations for distributed channel access for device-to-device (D2D) communication, the operations to configure the a User Equipment (UE) to:

transmit a connection identifier (CID) code at a beginning of a contention window to request channel access for a D2D transmission to a receiving device, wherein links for D2D transmissions from a transmitting device to a receiving device are identified by CID and each CID is mapped to a CID code, wherein CID codes are configured to be transmitted concurrently at the beginning of the contention window by transmitting devices requesting an allocation of channel resources for a D2D transmission;

receive a bandwidth grant from the receiving device, the bandwidth grant being transmitted by the receiving device in response to receipt of a CID code associated with the receiving device, the bandwidth grant being received during the contention window, along with bandwidth grants transmitted by other receiving devices for other CDs, the bandwidth grants being received sequentially during the contention window in an order based on a priority level of the CID, the priority level used b receiving devices to allocate bandwidth on a shared data channel to transmitting devices; and transmit data after reception of the bandwidth grants in time-frequency resources of the shared data channel indicated in an associated one of the bandwidth grants.

20. A non-transitory computer-readable storage medium that stores instructions for execution by one or more processors to perform operations for distributed channel access for device-to-device (D2D) communication, the operations to configure the one or more processors for:

transmitting a connection identifier (CID) code at a beginning of a contention window to request channel access for a D2D transmission to a receiving device, wherein links for D2D transmissions from a transmitting device to a receiving device are identified by CID and each CID is mapped to a CID code;

receiving a bandwidth grant from the receiving device, the bandwidth grant being transmitted by the received device in response to receipt of a CID code associated with the receiving device, the bandwidth grant being transmitted during the contention window, along with bandwidth grants for other CIDs, in an order based on a priority level of the CID; and transmitting data after reception of the bandwidth grants in time-frequency resources indicated in an associated one of the bandwidth grants, wherein when acting as a receiving device, the one or more processors are arranged to:

identify other CID codes received at the beginning of the contention window;

sort the received CID codes based on the priority level to determine when to transmit a bandwidth grant; and wait for transmission of any other bandwidth grants associated with higher priority CIDs before transmitting the bandwidth grant.

21. An apparatus of User Equipment (UE) arranged to perform device-to-device (D2D) distributed channel access in a 3GPP-LTE network, the apparatus comprising hardware processing circuitry and transceiver circuitry arranged to:

receive a plurality of connection identifier (CID) codes from transmitting devices at a beginning of a contention window, each of the CII) codes indicating a request for channel access for a D2D transmission, wherein links for D2D transmissions from a transmitting device to a receiving device are identified by a CID and each CID is mapped to a CID code, wherein CID codes are configured to be transmitted concurrently at the beginning of the contention window by transmitting devices to request an allocation of channel resources for a D2D transmission;

transmit a bandwidth grant to a transmitting device, the bandwidth grant being transmitted in response to receipt of a CID code associated with the transmitting device, the bandwidth grant being transmitted during the contention window, along with bandwidth grants, transmitted by other receiving devices, for other CIDs, the bandwidth grants being transmitted sequentially by the receiving devices during the contention window in an order based on a priority level of the CID, wherein prior to transmission of the bandwidth grant, the UE, when operating as a receiving device, is to allocate bandwidth on a shared data channel after receipt of any bandwidth grants associated with higher priority CIDs; and receive data, after transmission of the bandwidth grant, in time-frequency resources of the shared data channel indicated in an associated one of the bandwidth grants.

* * * * *